ic Office 2,710,068
Patented June 7, 1955

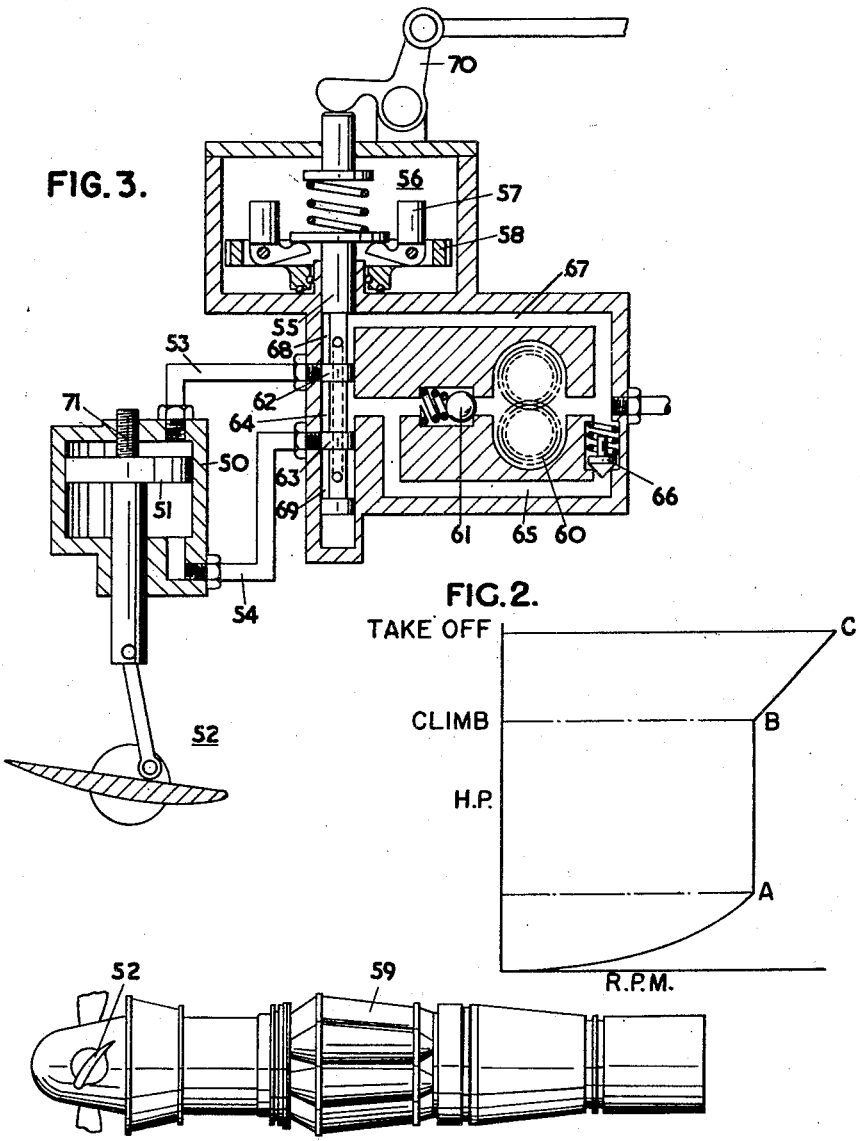

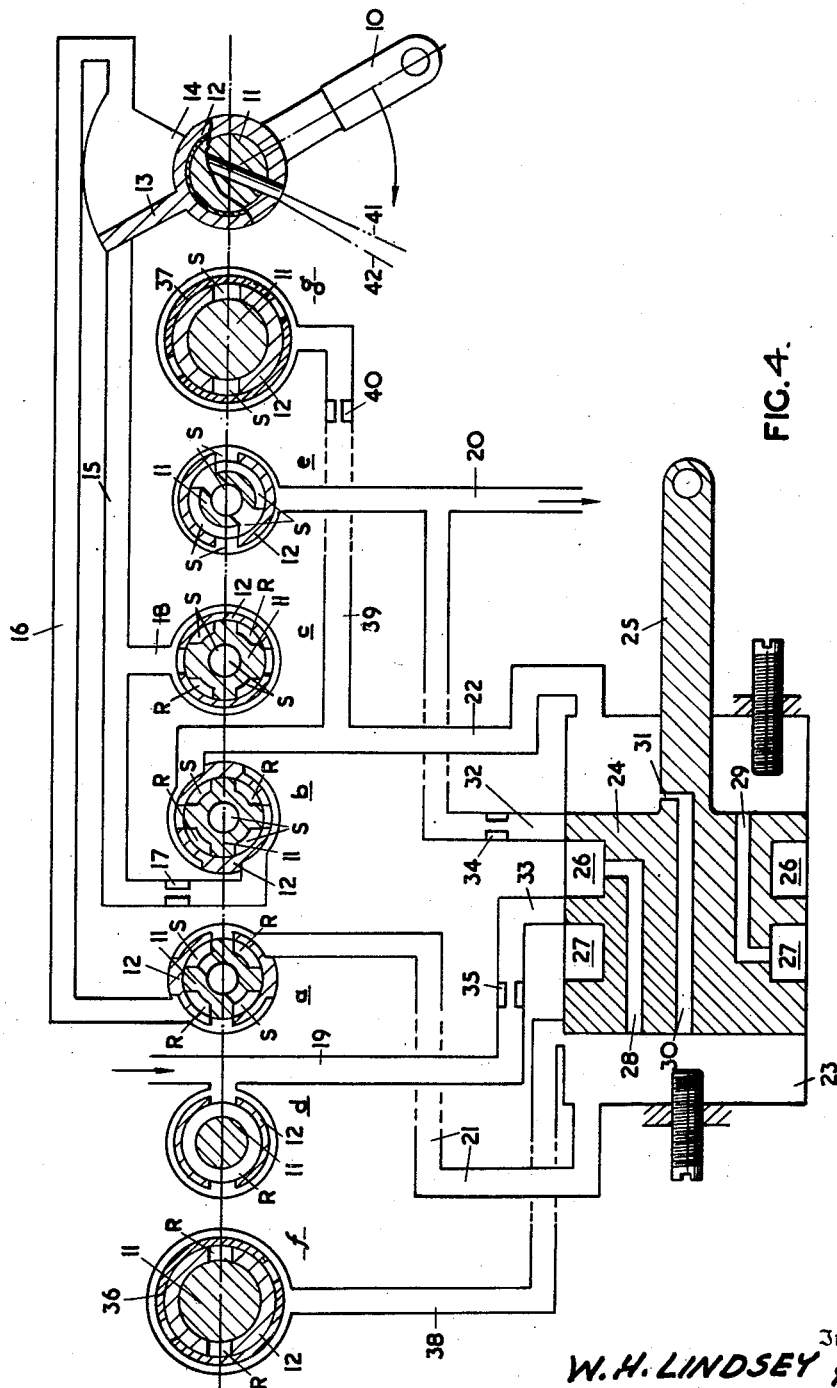

2,710,068

CONTROL OF PROPELLER-DRIVING GAS TURBINE ENGINES

William Henry Lindsey and Edwin G. Caswell, Coventry, England, assignors to Armstrong Siddeley Motors Limited, Coventry, England Application August 3, 1950, Serial No. 177,432

Claims priority, application Great Britain November 4, 1949

1 Claim. (Cl. 170—135.74)

This invention relates to a gas turbine aircraft engine of the kind which drives a variable-pitch propeller having a governor-controlled pitch-changing mechanism (commonly known as a constant-speed unit, or by the initials C. S. U.) such as is able, in certain conditions, to vary the pitch as necessary in order to restore the engine speed to a predetermined value when the engine speed changes.

With the normal system of control, for a given fuel flow a certain horse-power will be obtained at a certain engine speed, with the propeller at a pitch to produce this engine speed. The engine speed varies with the power output with a smooth curve. This is achieved by a particular interconnection of the main engine control (hereinafter referred to as the throttle), the fuel control unit, and the C. S. U.

The normal system of control is quite satisfactory in ordinary landing conditions, but when an aircraft as aforesaid is to land, say, on an aircraft carrier a different technique has to be employed owing to the confined space and length of run available. It is now usual in deck landing for the pilot, after his approach, to set his normal aircraft controls so as to bring the aircraft to its correct landing attitude, and thereafter to leave those controls as thus set and to complete the landing by manipulation of the throttle.

It is therefore important that the response of the engine to movement of the throttle should in some conditions be as nearly instantaneous as is possible, i. e., that full power should be available at the propeller without delay when the pilot requires it, and vice versa.

This is not possible with the normal control, which gives an engine acceleration from idling conditions to climb or normal full power conditions in approximately between three to five seconds—i. e., the full power increase when opening the throttle rapidly may not be available at the propeller for approximately five seconds. (During acceleration of the engine the power required to increase the engine speed is approximately, say, 70% of the normal power output of the engine, so that during five seconds of speed increase only approximately 30% of the normal power is available at the propeller.)

It is the object of the present invention to avoid the disadvantages above-mentioned in a simple manner.

According to the invention, the control, for the governor setting of the said mechanism, is connected with the throttle in such manner as to be initially adjusted, by a rapid and sufficient opening movement of the throttle, so that the said mechanism will "coarsen" the pitch as necessary for the additional power (resulting from the opening of the throttle) to be available at the propeller substantially instantaneously and not applied for accelerating the engine, whereas for a rapid and sufficient closing movement of the throttle the governor setting is initially adjusted so that the said mechanism will "fine" the pitch as necessary for the lower power (resulting from the closing movement of the throttle) to be available at the propeller substantially instantaneously and not applied for decelerating the engine; whilst in either case the governor setting is then re-adjusted, at a predetermined rate, to keep the engine speed at the predetermined value.

Thus, if the engine is running at its constant-speed and medium power, and if the throttle is then opened quickly to a sufficient extent, an extra amount of fuel is supplied which, unless otherwise provided for, would immediately cause a rise in engine speed. If, therefore, it is so arranged that, when the extra fuel is quickly supplied, the control by which the governor setting is adjusted (such control being hereinafter referred to as the C. S. U. control) is so adjusted that a speed lower than the constant engine speed is selected temporarily to enable the propeller pitch to be "coarsened" to prevent the tendency for the engine speed to rise, and that the C. S. U control is thereafter returned at a predetermined rate to reduce the tendency of the engine speed to fall until the C. S. U. selection attains a position corresponding to the constant engine speed, the propeller will then be in the correct pitch to absorb the whole of the increase in power without any substantial alteration in the engine speed having occurred.

In this way substantially none of the power developed is used for accelerating the rotor system, and it is substantially immediately available at the propeller.

If, on the other hand, the throttle is moved slowly, the C. S. U. selection must keep the engine speed constant.

There are several methods of interconnecting the pilot's throttle control and the C. S. U. to produce the desired effect, i. e., so that if the throttle is quickly moved, the fuel control will move in the same sense to choose a different amount of fuel while the C. S. U. control is moved in the opposite sense for a predetermined amount and thereafter in the same sense as the fuel control until it attains a position corresponding to the constant speed of the engine; and so that if the throttle is slowly moved the C. S. U. selections still tend to keep the engine speed constant as speed variations occur.

In the accompanying diagrammatic drawings:

Figure 1 is an elevation of a variable-pitch propeller driven by a gas turbine engine;

Figure 2 is a diagram indicating roughly the output range at which the engine speed is to be maintained constant;

Figure 3 is a diagram of a usual constant-speed unit for controlling the pitch; and Figure 4 is a diagram showing a satisfactory and preferred arrangement of control according to the invention, in which, for clearness, seven sections along the length of a valve mechanism (marked a, b, c, d, e, f, g, respectively) are shown displaced, although in practice these will be coaxial.

In the diagram of Figure 2, in which the abscissae are speed and the ordinates engine power, the point A of the graph represents the full idling speed, i. e., the minimum power at which the C. S. U. takes control, and the point B the climb or normal maximum power; but for take-off purposes, or in other exceptional conditions, a still higher output can be temporarily used, as indicated by the portion of the curve B—C, in which case the engine speed increases beyond the predetermined speed represented by the line A—B.

Referring now to Figures 1 and 3, the latter shows a normal form of constant-speed unit having a pitch-changing cylinder 50 with a piston 51 therein connected to the propeller unit 52 in a well understood manner, whilst the opposite ends of the cylinder communicate, respectively, by coarse and fine pitch passages 53 and 54 with ports controlled by a valve 55 the position of which is controlled by a governor mechanism 56. The governor weights 57 are pivotally mounted on a gear wheel 58 which is driven in any convenient manner from the gas turbine engine 59. The delivery of a booster pump 60 communicates through a non-return valve 61 with the annular passage 64 between the lands 62, 63 on the valve 55, the lands controlling ports to the passages 53 and 54. A by-pass passage 65 interconnects the inlet and delivery sides of the pump and contains a loaded relief valve 66. A further passage 67 connects the inlet of the pump with the annular passage 68 above the top land 62 of the valve 55, for exhaust purposes, whilst internal passages of the valve connect that annular passage 68 with the annular passage 69 below the lower land 63 of the valve.

The manner in which the said mechanism operates for maintaining the engine speed constant, as long as the governor control lever 70 is not moved, is well-known in practice. Actually, the pitch-changing piston 51 is shown against the fine pitch stop 71 and the governor weights 57 are shown as being swung outwardly to the constant speed position, and in these conditions the engine 59 is running at its constant speed and minimum power. The valve 55 occupies the position shown, with the lands 62, 63 blanking the ports for the passages 53, 54, respectively, so that the piston 51 is hydraulically locked against movement.

Referring now to Figure 4, this shows a preferred arrangement in which the control lever 10 may be regarded as the pilot's throttle. This is connected, in a known manner, with the fuel control unit through an appropriate linkage, neither of these latter being shown in Figure 4. The control lever 10 is fixed to one part of a rotatable valve member 11 provided with passages and ports as shown in the various sections. Surrounding this valve member is a rotatable valve sleeve 12 which is also provided with ports and passages along its length as shown in the various sections. Integral with this sleeve is a vane 13, forming the movable member of a fluid pressure servo or follow-up mechanism, the chamber 14 of which is connected at opposite sides of the vane by passages 15, 16 with the appropriate sections *a*, *b*, and *c* of the valve member and sleeve. A vane timing jet 17, in the form of a metered restriction, is provided in the portion of the passage 15 associated with the section *b*, and a branch 18 from this same passage is the connection to the section *c*.

Hydraulic fluid, for example, oil, under pressure from the passage 19 is supplied to the annular space R round the valve member 11 at the section *d* irrespective of any position of the valve member or sleeve, and is at all times led therefrom along the two longitudinal passages (marked R) in the sections *a*, *b*, and *c*. The two intermediate longitudinal passages in the sections *a*, *b*, and *c*, as well as the central bore therein, communicate continuously through ports and passages in the valve member and sleeve at section *e* with an exhaust passage 20, all of which are marked S.

Two passages 21 and 22 connect the sections *a* and *b*, at points opposite the passages 16 and 15, respectively, with the opposite ends of a cylinder 23 containing a piston 24, the latter having a piston rod 25 coupled by means, not shown, with the control lever 70 of the C. S. U. This piston has two annular grooves 26, 27 in its periphery, the groove 26 nearer the piston-rod end communicating by an internal passage 28 with the opposite end of the piston, while the other groove 27 communicates with the piston-rod end by an internal passage 29. A central bore 30, restricted at 31, interconnects both ends of the piston.

When the piston is in the position which it occupies when the C. S. U. control is set for the predetermined constant engine speed (i. e., as shown in the drawings), its right-hand and central lands are aligned with passages 32, 33 which communicate, respectively, with the exhaust passage 20 and the pressure passage 19, metered orifices 34, 35 (balance jet and piston return jet) being provided, respectively, in the passages 32, 33.

(Actually, in this position of the piston, the passages 32, 33 are of a width such that they can slightly overlap either the left-hand edges only, or the right-hand edges only, of these piston lands for the following purpose. All the parts are shown in the maximum idling position (after which the C. S. U. takes control), and in this position there is a constant small circulation of oil through the piston. Assuming that it is the left-hand edges only that are overlapped, oil then passes from the passage 33 through the small overlap of the central land into the annular passage 27, whence it is transferred through the internal passage 29 into the cylinder space at the right-hand side of the piston, thence through the restriction 31 and the passage 30 into the cylinder space at the opposite side of the piston. From here it passes through the internal passage 28 into annular passage 26, finally exhausting through the slight overlap by the passage 32. Conversely, if it is the right-hand edges of the lands that are overlapped when the piston is in its balanced position, oil will then pass from the passage 33 through the small overlap of the central land into the annular passage 26, and through the passages 28 and 30, and the restriction 31, finally exhausting through the slight overlap by the passage 32. In this manner the oil is not allowed to stagnate and become thick, and in consequence a quick response of the whole control to any change of throttle setting is ensured.)

Ignoring the function of sections *f* and *g* for the moment, if the control lever 10 is now moved relatively quickly to the "maximum climb" position, indicated at 41, the valve member 11 is rotated clockwise which brings the pressure passages R of section *b* into register with the ports in its surrounding sleeve part, and the exhaust passages S of section *a* into register with the ports in its surrounding sleeve part. Pressure oil is thereby fed via the passage 22 to the right-hand side of piston 24, and also via the vane timing jet 17 in the passage 15 to the left-hand side of the vane 13. Due to the restriction of the balance jet 34 in the passage 32 the piston will move to the left and thereby act to adjust the C. S. U. control, i. e., to move the lever 70 clockwise to select temporarily a lower speed, in the manner previously described.

During this period the oil from the left-hand side of the piston is being exhausted through the passage 21 and the ports in the sleeve part and passages S of section *a*. At the same time the oil, being fed to the passage 15 at a slower rate, due to the vane timing jet 17, is moving the vane 13 to the right and thus rotating the sleeve 12, oil from the opposite side of the vane being exhausted through the passage 16 and the passages S of the section *a*. The movement of the vane will continue until it has moved to the same extent angularly as the control lever 10 and valve member 11 were moved, and, during this period of movement, the ports in the sleeve will be moving from a position of register with the passages in the valve member until they are completely closed again, i. e., until they occupy the same relative positions as shown in the drawings but both displaced angularly the same amount as the vane and control lever.

When the pressure and exhaust flows through the valve mechanism are thus stopped, the pressure oil in the passage 33 in then effectively applied through the restriction 35 to the annular groove 26 and then through the passage 28 to the left-hand end of the piston so as to force this back to the intermediate or balanced position, the oil from the opposite end of the piston exhausting to the passage 20 via the passage 32 and the balance jet 34. The rate of this return movement depends on the size of the piston return jet 35 in the pasage 33, which is normally slightly smaller than the balance jet 34.

The two lands on the valve member 11 of section *c* which control the ports in the sleeve 12 are wider than these ports for the following reason. The rate of movement of the vane 13, and therefore of the sleeve 12, depends on the size of the vane timing jet 17 which is so chosen that, for normal quick opening of the throttle, the vane 13 will follow with only a slight lag. If the rate of opening of the throttle is increased beyond this, the lag of the vane would be greater, and it is in such condition that the section *c* portion operates. In this case the above-mentioned wide lands of the valve member 11 open the coacting ports in the sleeve so that pressure oil is fed directly to the vane chamber 14. The vane will, therefore, move substantially in step over a substantial range of the throttle movement with but slight lag, i. e., until the port in the sleeve (section c) is again covered, after which the remaining movement of the vane will be effected through section b and the restriction 17.

Referring now to the sections f and g, these only become effective when the control lever 10 is moved beyond the "maximum climb" position indicated at 41, i. e., when the engine speed can be varied from the predetermined constant speed, as for example, during "take-off," the position of which is indicated at 42. At each of these sections a fixed sleeve 36 (section f) and 37 (section g) surrounds the rotatable sleeve 12, and these fixed sleeves are provided with diametrically-opposite ports disposed as shown and communicating with annular passages round the fixed sleeves. A passage 38 connects the annular passage of sleeve 36 to the cylinder 23 so as to overlap the left-hand land of the piston as shown, and a passage 39 containing a take-off timing jet, shown as a metered restriction 40, connects the right-hand end of the cylinder with the annular passage of the sleeve 37 via the passage 22.

In the rotatable sleeve of each section are two diametically-opposite passages, those in section f (marked R) being in communication with the pressure supply and those in section g (marked S) being in communication with the exhaust.

Up to the "maximum climb" position these passages never register with the ports in the fixed sleeves, but beyond this position they do. Thus, when the lever 10 is moved directly from the "idling" position shown to the "take-off" position (42), the sequence of operations up to the "maximum climb" position (41) is as previously described. The piston 24 first moves to the left temporarily (such movement cutting off the left-hand end of the cylinder 23 from the passage 38). The piston then moves back to its balanced position, in which the passage 38 is again in communication with the left-hand end of the cylinder, and the vane and rotatable sleeve continue to move still further until they attain the "take-off" position, when the passages in the rotatable sleeve will be in register with the ports in the fixed sleeve of sections f and g. Pressure oil is then fed directly to the left-hand end of the cylinder 23, thereby forcing the piston 24 to the right and so choosing a different setting for the C. S. U. control which will be retained in this position as long as the throttle is fully open.

The oil from the right-hand side of the piston and that fed to the passage in the valve 11 of section b, which would otherwise be fed through passage 22 to the right-hand end of the cylinder, will exhaust through passages 22 and 39, the restriction 40, and sections g and e to the exhaust passage 20. The pressure oil fed to the annular passage 27 in the piston will be led through the passage 29 to the right-hand side of the piston and will be likewise exhausted. Oil will also be led from the left-hand side of the piston through passage 28 to the annular passage 26 and so to exhaust through the passage 32, and a small leak of oil will also pass from this side of the piston through the control passage 30 and the restriction 31 to the opposite side and so to exhaust. The rate of movement of the piston is controlled by the size of the restriction 40 in passage 39.

If, during an emergency, it is desired to move say from "maximum climb" position to "take-off," substantially the same sequence of movements of the piston would occur as first described with the exception that the travel of the piston temporarily to the left would not be so great or of the same duration before it commenced its backward travel.

It will be understood that for relatively quick deceleration, substantially the reverse of the foregoing movements of the various parts takes place.

What we claim as our invention and desire to secure by Letters Patent of the United States is:

In combination, an engine having a throttle, a variable-pitch propeller driven by said engine, a pitch-changing mechanism operatively connected to said propeller, a governor driven by said engine and having a predetermined setting for acting on said pitch-changing mechanism to vary the pitch as necessary, in certain conditions, to restore the engine speed to a predetermined value when the engine speed varies, a control member operatively connected to said governor for varying the predetermined setting of the governor, and means operatively connected to said throttle and control member and adapted to be actuated selectively by a rapid and sufficient opening movement or closing movement of the throttle for initially moving said control member to vary the governor setting to permit said mechanism to "coarsen" or to "fine" the pitch of the propeller commensurate with the movement of the throttle and depending upon whether it is an opening or closing movement of the throttle to prevent the resultant additional power or lower power from being applied for accelerating or decelerating said engine and to make said power available at the propeller substantially instantaneously, said means subsequently actuating said control member to restore said governor to its predetermined setting to keep the engine at the predetermined value, said means comprising a valve member connected to said throttle, a valve sleeve member surrounding said valve member, said valve member and valve sleeve member being relatively movable, a fluid pressure servo device connected to said valve sleeve member for moving said sleeve member relative to said valve member, a fluid pressure servo device connected to said control member for actuating said control member, a source of fluid pressure, and exhaust means for said fluid pressure, said valve member and said valve sleeve member having first ports which, when said throttle is opened or closed at a normal rate, supply the fluid pressure to a first passage which includes said second-mentioned servo device and leads to exhaust whereby said control member is actuated for varying said predetermined setting of said governor in the appropriate direction at one rate, said valve member and said valve sleeve member having second ports which, when said throttle is opened or closed at a normal rate, also supply the fluid pressure to a second passage which includes said first-mentioned servo device and a constriction and leads to exhaust whereby said first-mentioned servo device is actuated to move said valve sleeve member to follow up said valve member for closing said first ports and said second ports whereby to arrest movement of said second servo device, said valve member and said valve sleeve member having third ports which, when said throttle is opened or closed at a faster than normal rate, supply the fluid pressure to a third and unconstricted passage which also includes said first-mentioned servo device and leads to exhaust whereby said first-mentioned servo device is operated at a faster than normal rate for actuating said valve sleeve member more quickly to follow up said valve member and close said first and second ports so as to cause said second servo device to effect a less variation of the predetermined setting of said governor, and means actuated by said second-mentioned servo device for applying the fluid pressure to restore said second-mentioned servo device to a neutral position at the conclusion of a throttle adjustment.

References Cited in the file of this patent

UNITED STATES PATENTS

| | | |
|---|---|---|
| 2,205,625 | Mader | June 25, 1940 |
| 2,391,629 | Keller | Dec. 25, 1945 |
| 2,499,813 | Braey | Mar. 7, 1950 |
| 2,525,694 | Lindsey et al. | Oct. 10, 1950 |